US008412378B2

(12) United States Patent
Abdallah et al.

(10) Patent No.: US 8,412,378 B2
(45) Date of Patent: Apr. 2, 2013

(54) IN-VIVO TENSION CALIBRATION IN TENDON-DRIVEN MANIPULATORS

(75) Inventors: Muhammad E. Abdallah, Houston, TX (US); Robert Platt, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 640 days.

(21) Appl. No.: 12/629,637

(22) Filed: Dec. 2, 2009

(65) Prior Publication Data

US 2011/0130879 A1 Jun. 2, 2011

(51) Int. Cl.
*G05B 19/04* (2006.01)
*G05B 19/18* (2006.01)

(52) U.S. Cl. .......................... 700/254; 700/245; 700/253

(58) Field of Classification Search .................... 294/25, 294/81.1–81.62, 86.4–119.4, 170–171; 254/264–386; 414/1–7; 702/41–44, 85–91, 702/105, 139, 179–181, 186; 700/1, 54–55, 700/61–65, 245–264
See application file for complete search history.

(56) References Cited

U.S. PATENT DOCUMENTS

| | | | | |
|---|---|---|---|---|
| 4,815,006 A | * | 3/1989 | Andersson et al. | 700/254 |
| 5,297,238 A | * | 3/1994 | Wang et al. | 700/259 |
| 5,784,542 A | * | 7/1998 | Ohm et al. | 700/260 |
| 6,791,291 B2 | * | 9/2004 | Shimizu et al. | 318/568.1 |
| 7,250,028 B2 | * | 7/2007 | Julian et al. | 600/229 |
| 2003/0158463 A1 | * | 8/2003 | Julian et al. | 600/104 |
| 2004/0139110 A1 | * | 7/2004 | LaMarca et al. | 707/104.1 |
| 2005/0234566 A1 | | 10/2005 | Joublin | |
| 2010/0077867 A1 | * | 4/2010 | Ihrke et al. | 73/862.041 |
| 2010/0081969 A1 | * | 4/2010 | Ihrke et al. | 600/587 |
| 2010/0121222 A1 | * | 5/2010 | Abdallah et al. | 600/587 |
| 2010/0152898 A1 | * | 6/2010 | Reiland et al. | 700/261 |
| 2010/0280659 A1 | * | 11/2010 | Abdallah et al. | 700/250 |
| 2011/0071678 A1 | * | 3/2011 | Ihrke et al. | 700/258 |

OTHER PUBLICATIONS

Sato Daisuke, "Human Intention Recognition System by a Robot with Sensors" CD-ROM of 20th Anniversary Academic Lecture meeting of Robot Society of Japan, 2012.

* cited by examiner

*Primary Examiner* — Khoi Tran
*Assistant Examiner* — Bhavesh V Amin
(74) *Attorney, Agent, or Firm* — John A. Miller; Miller IP Group, PLC

(57) ABSTRACT

A method for calibrating tension sensors on tendons in a tendon-driven manipulator without disassembling the manipulator and without external force references. The method calibrates the tensions against each other to produce results that are kinematically consistent. The results might not be absolutely accurate, however, they are optimized with respect to an initial or nominal calibration. The method includes causing the tendons to be slack and recording the sensor values from sensors that measure the tension on the tendons. The method further includes tensioning the tendons with the manipulator positioned so that it is not in contact with any obstacle or joint limit and again recording the sensor values. The method then performs a regression process to determine the sensor parameters that both satisfy a zero-torque constraint on the manipulator and minimize the error with respect to nominal calibration values.

15 Claims, 1 Drawing Sheet

IN-VIVO TENSION CALIBRATION IN TENDON-DRIVEN MANIPULATORS

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefore.

BACKGROUND OF THE INVENTION

1. Field of the Invention

This invention relates generally to a system and method for calibrating the tendons in a tendon-driven manipulator and, more particularly, to a system and method for providing in-vivo tendon tension calibration for a tendon-driven manipulator that calibrates the tensions against each other without the need for an external force reference.

2. Discussion of the Related Art

Dexterous robot systems typically comprise robot arms and hands that operate to grasp and manipulate objects or parts during assembly or other applications. The term "robot manipulator" is used to describe all or part of one or more robot arms and hands. Tendon-driven robot manipulators are actuated using tendons or cables that allow the actuators to be located outside of the part of the manipulator being controlled. Tendon transmissions are frequently used to actuate distal joints in robot manipulators. They can improve strength-to-weight ratios by allowing actuators to be located closer to the base of the manipulator. They also give the mechanical designer more flexibility in actuator selection and manipulator size. For example, when the manipulator is a tendon-driven finger in a humanoid robotic hand, the actuators are typically located in the forearm area of the robotic arm. In this case, tendons extend from the forearm actuators to the fingers, where they are attached.

Force and impedance control of tendon-driven manipulators improves with accurate tendon tension measurements. This relies on a consistent sensor output and an accurate calibration of the output. However, the output from the sensor for a particular tension can vary over time and with temperature, known as sensor drift. Further, discrete events may cause sudden changes to the sensor measurements, such as external impacts. Thus, the sensors need to be calibrated from time to time to compensate for these changes.

Because the tendon-driven manipulator requires more tendons than joints in such a redundant network, the tension on each individual tendon cannot be determined exclusively from external reference forces. Rather, a reference force must be applied to each tendon independently, where each sensor in the manipulator must be removed therefrom, and coupled to tension testing equipment. In other words, the sensors cannot be calibrated while they are within the manipulator using the testing equipment because there are multiple tendons controlling each joint. Hence, there are internal forces between the tendons that cannot be sensed externally. At the same time, disassembling the manipulator whenever calibration is required is not practical.

SUMMARY OF THE INVENTION

In accordance with the teachings of the present invention, a method is disclosed for calibrating tension sensors for tendons in a tendon-driven manipulator without disassembling the manipulator and without external force references. The method calibrates the tensions against each other to produce results that are kinematically consistent. The results might not be absolutely accurate, however, they are optimized with respect to an initial or nominal calibration. The method includes causing the tendons to have zero tension and recording sensor values from sensors that measure the tension on the tendons. The method further includes positioning the manipulator so that it is not in contact with any obstacle and none of the joints in the manipulator are at their limit. The method then puts tension on the tendons and records sensor tension values from the sensors when there is tension on the tendons. The method uses these two data points and a regression process to determine the sensor calibration parameters. The regression process finds the solution that satisfies the zero-torque constraint while minimizing the error compared to the initial, or nominal, calibration.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for calibrating the tendons in a tendon-driven manipulator is merely exemplary in nature, and is in no way intended to limit the invention or its applications or uses.

As will be discussed in detail below, the present invention proposes a technique for calibrating the sensors in a tendon-driven manipulator without having to remove the sensors from the manipulator. Generally, the process includes starting with a nominal gain for each of the sensors in the manipulator based on previous calibration data. The process records the sensor readings at two data points. The first point involves de-tensioning the tendons so that they are all slack, and thus have zero tension on them. The second point involves tensioning all of the tendons so that they are taught and the manipulator is not pressed against any external forces. Hence, the tendon tensions all sum to produce zero net torque at the joints. This situation is referred to herein as a "balanced" configuration or the "zero-torque" constraint. A regression is then performed on these two data points to find a calibration that both satisfies the zero-torque constraint and produces the closest results possible (in a least-squares sense) to nominal calibration values. The method calibrates the tensions against each other to produce results that are kinematically consistent. This does not necessarily produce calibrated values that are accurate relative to an absolute reference; however, they will be accurate relative to each other. This relative accuracy between the tendons improves the performance of the manipulator controller.

The invention thus addresses the problem of how to provide a relative calibration among the tendons of the robotic manipulator. The calibration process improves the performance of the manipulator controller, although the actual value of the calibrated readings might not be accurate. Based on the nominal calibration, the calibration process will find the minimum error solution that satisfies a condition of zero external torque on the manipulator.

Figure 1:
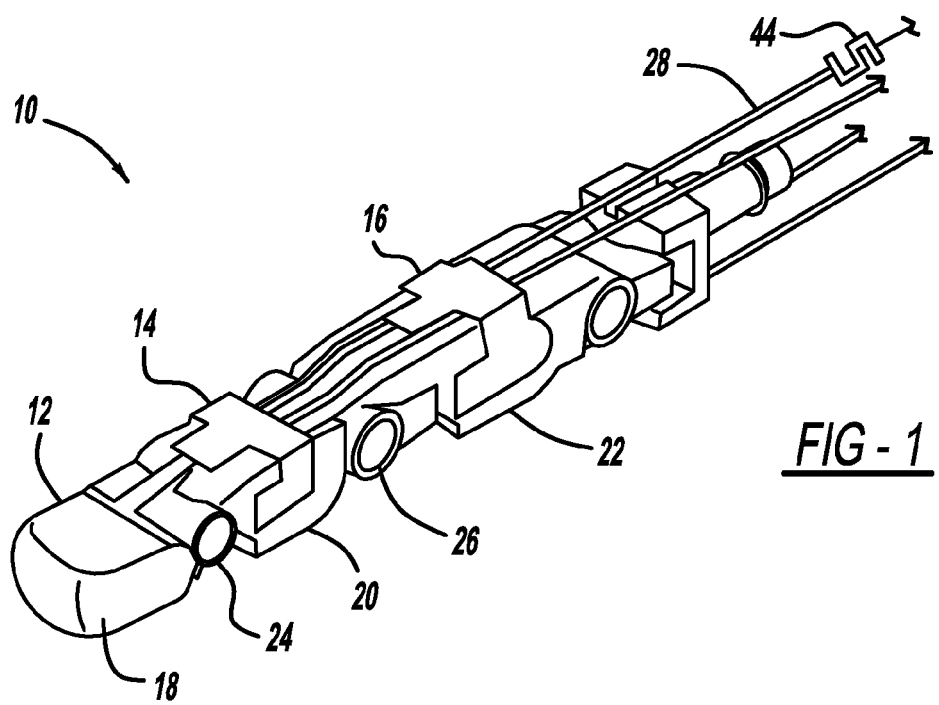
FIG. 1 is a perspective view of a robotic finger manipulator including a plurality of tendon driven joints.

FIG. 1 is a perspective view of a robotic finger 10 for a robotic arm, where the finger 10 is driven by tendons 28. Although this embodiment shows a robotic finger, the calibration process of the present invention is applicable to any tendon-driven manipulator. The robotic finger 10 includes three finger sections, namely, a tip section 12, an intermediate section 14 and a base section 16. The tip section 12 includes a pad 18, the intermediate section 14 includes a pad 20 and the base section 16 includes a pad 22 that allow the finger 10 to effectively grasp a particular part (not shown). The finger sections 12, 14 and 16 and the pads 18, 20 and 22 can be made of any suitable material, such as aluminum, for a particular application. The tip section 12 pivots relative to the intermediate section 14 on a shaft 24 and the intermediate section 14 pivots relative to the base section 16 on a shaft 26.

The joints of the finger 10 are manipulated by the tendons 28 in a manner that is well understood in the art. Each tendon 28 is coupled to a tension sensor 44, typically in the forearm area of the robotic arm. The tension sensors 44 provide a signal of the tension in the tendons 28 that provides an indication of the force on the finger 10. The tendons 28 provide a pulling force that is actuated by a suitable actuator.

Assuming that all joints in the finger 10 are revolute, the relationship between tendon tensions and joint torques can be described by:

$$\tau = Rf \quad (1)$$

Where $\tau$ is the vector of n joint torques and f is a vector of $m \geq n+1$ tendon tensions.

Note that by inverting this relationship, a set of tendon tensions that generates a specified torque can be calculated as:

$$f = R^+\tau + N(R)\lambda \quad (2)$$

Where $R^+$ is the pseudo-inverse of R and $N(R)$ is the null space of R. $\lambda \in R^{m-n}$ is a vector of arbitrary tensions projected into the null-space. This null-space component represents the set of tensions that produce zero net torque on the finger 10. In other words, they represent the internal forces between the tendons.

Assuming that a linear fit applies to the sensor 44, each sensor reading $s_i$ is required to be calibrated using two parameters, namely, a gain $m_i$ and an offset $b_i$. For each tendon 28, the relationship for the tension sensor reading is given by:

$$f_i = m_i(s_i - b_i) \quad (3)$$

Where $f_i$ is the tension on tendon i.

For the whole set of n tendons, the n equations can be expressed in the following two matrix forms.

$$f = M(s-b) \quad (4)$$

$$f = (S-B)m \quad (5)$$

In this notation, capitalized symbols refer to diagonal matrices for the respective elements, and bold symbols refer to column matrices. For example:

$$M = \begin{bmatrix} m_1 & & 0 \\ & \ddots & \\ 0 & & m_n \end{bmatrix}, \quad m = \begin{pmatrix} m_1 \\ \vdots \\ m_n \end{pmatrix} \quad (6)$$

Based on the design of the finger 10, the relationship between the torques $\tau$ at the joints, and the tensions f at the tendons 28 follows as:

$$\tau = Rf \quad (7)$$

Where R is known as a tendon map that contains the joint radii data mapping tendon tensions to joint torques.

Figure 2:
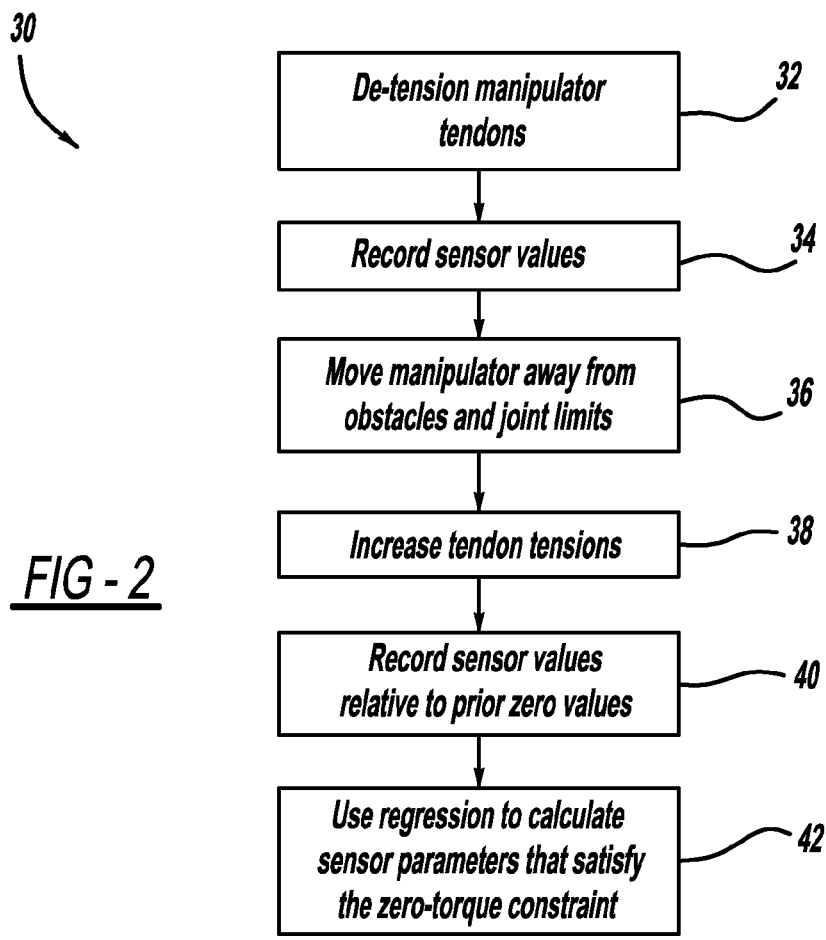
FIG. 2 is a flow chart diagram showing a calibration process for the tendons in the manipulator shown in FIG. 1.

FIG. 2 is a flow chart diagram 30 showing a calibration process for calibrating the tendons 28 in the finger 10, as discussed above. The process starts at box 32 where the tendons 28 are de-tensioned so that there is no force on the tendons 28, i.e., the tendons 28 are slack. Particularly, all of the actuators (not shown) that control the tendons 28 are moved forward so that the tendons 28 are slack and each tendon 28 sees zero tension. The algorithm records the sensor reading $^0s$ when the tendons 28 are in the slack position at box 34.

Using this data, the offset b is determined for each sensor 44 in the manipulator 10. There values are solved as:

$$f = M(^0s - b) = 0$$

$$b = {^0s} \quad (8)$$

The next step is to tension all of the tendons 28 while ensuring that the finger 10 is not up against any joint stops or external forces. The algorithm thus causes the finger 10 to be positioned at a location at box 36 where it is away from any obstacles that could apply a force on the finger and all of the joints in the finger 10 are not at a joint limit. This ensures that the joint torques are all zero. Once in this position, the algorithm causes the actuators to increase the tendon tension at box 38. The amount of force on the tendons 28 is not important so long as there is a force on the tendons 28. With the finger 10 in this position, there should be zero torque on each joint in the finger 10 because the pulling force would be the same for both sides of the joint. The algorithm then records the sensor measurement values, $^1s$. The recorded sensor values can be relative to the prior zero sensor values for each sensor 44 at box 40. The joint torques and tensions at this moment are referred to with the pre-superscript of 1:

$$^1\tau = R^1f = 0 \quad (9)$$

The algorithm then uses the offset values and a regression process to determine sensor parameters that satisfy the zero-torque constraint at box 42. The actual solution should lie in the null-space of R. The algorithm takes the force reading, based on the nominal calibration of the gains $^nm$ and projects it orthogonally into the null-space R. Referring to the second form of the calibration equation (5), that nominal force reading is:

$$^nf = (^1S - B)^nm \quad (10)$$

After projecting this minimal reading into the null space R, the calibration gain m can be solved as:

$$^1f = (I - R^+R)^nf$$

$$m = (^1S - B)^{-1\,1}f \quad (11)$$

Where I is the identity matrix and $R^+$ is the pseudoinverse of R.

Alternatively, the individual elements of the gain m can be solved for as follows:

$$m_i = \frac{^1f_i}{^1s_i - b_i} \quad (12)$$

Particularly, the algorithm minimizes the error between what the particular sensor is initially reading and what it should be reading. The regression operation can be any suitable process, such as a least-squares fit operation. The least-squares fit operation is performed for all of the sensor difference values simultaneously.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for calibrating the tension on a set of tendons that drive a manipulator without directly applying any external force references to either the manipulator or the tendons, said calibrating method comprising:
   causing the tendons to have zero tension and recording sensor readings;
   positioning the manipulator so that it is not in contact with any obstacle and none of the joints in the manipulator are at their limit;
   putting a tension on the tendons and recording sensor readings; and
   solving for calibration parameters using a regression process that satisfies a zero-torque constraint on the manipulator.

2. The method according to claim 1 wherein using the regression process includes determining that a solution of the regression process lies in a null-space.

3. The method according to claim 1 wherein using the regression process includes performing a least-squares fit process.

4. The method according to claim 1 wherein the manipulator is a robotic finger including finger joints.

5. A method for calibrating the tension on a set of tendons that drive a manipulator without disassembling the manipulator or the tendons, or any part therein, said calibrating method comprising:
   causing the tendons to have zero tension and recording sensor readings;
   positioning the manipulator so that it is not in contact with any obstacle and none of the joints in the manipulator are at their limit;
   putting a tension on the tendons and recording sensor readings; and
   solving for calibration parameters using a regression process that satisfies a zero-torque constraint on the manipulator, wherein using the regression process includes identifying that a solution to the regression processor lies in a null-space and solving for a sensor calibration gain using a least-squares fit process.

6. The method according to claim 5 wherein the manipulator is a robotic finger including finger joints.

7. A robotic system that calibrates the tension on tendons in a manipulator without disassembling the manipulator, said system comprising:
   a manipulator having a revolute joint;
   a set of tendons attached to the revolute joint;
   a controller that calibrates the set of tendons using a method including:
   causing the tendons to have zero tension and recording sensor readings;
   positioning the manipulator so that it is not in contact with any obstacle and none of the joints in the manipulator are at their limit;
   putting a tension on the tendons and recording sensor readings; and
   solving for calibration parameters using a regression process that satisfies a zero-torque constraint on the manipulator.

8. The system according to claim 7 wherein solving for calibration parameters using a regression process determines that a solution of the regression process lies in a null-space.

9. The system according to claim 7 wherein performing a regression process performs a least-squares fit process.

10. The system according to claim 7 wherein the manipulator is a robotic finger including finger joints.

11. The system according to claim 7 wherein solving the calibration equations includes minimizing the error with respect to nominal calibration values.

12. The method according to claim 1 wherein solving the calibration equations includes minimizing the error with respect to nominal calibration values.

13. The method according to claim 5 wherein solving the calibration equations includes minimizing the error with respect to nominal calibration values.

14. The method according to claim 1 wherein the manipulator joint is a revolute joint.

15. The method according to claim 5 wherein the manipulator joint is a revolute joint.

* * * * *